(12) United States Patent
Matsunaga et al.

(10) Patent No.: US 6,960,091 B2
(45) Date of Patent: Nov. 1, 2005

(54) CARD CONNECTOR

(75) Inventors: Akihiro Matsunaga, Akishima (JP);
Masafumi Kodera, Akishima (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 10/741,080

(22) Filed: Dec. 19, 2003

(65) Prior Publication Data

US 2004/0132326 A1 Jul. 8, 2004

(30) Foreign Application Priority Data

Dec. 27, 2002 (JP) ........................................ 2002-381428

(51) Int. Cl.$^7$ .............................................. H01R 13/62
(52) U.S. Cl. .................... 439/159; 439/138; 439/945
(58) Field of Search ................................ 439/159, 138, 439/155, 152, 945, 946; 200/524

(56) References Cited

U.S. PATENT DOCUMENTS

| | | | | | |
|---|---|---|---|---|---|
| 4,874,323 | A | * | 10/1989 | Shibano ...................... | 439/260 |
| 5,660,553 | A | * | 8/1997 | Larabell ...................... | 439/152 |
| 5,841,085 | A | * | 11/1998 | Rittinghaus et al. ........ | 200/524 |
| 6,639,164 | B2 | * | 10/2003 | Wang .......................... | 200/524 |
| 2002/0142640 | A1 | | 10/2002 | Abe | |
| 2002/0142663 | A1 | * | 10/2002 | Takeyama et al. .......... | 439/638 |
| 2002/0192991 | A1 | | 12/2002 | Motojima .................... | 439/159 |

FOREIGN PATENT DOCUMENTS

| | | |
|---|---|---|
| JP | 6-37914 | 10/1992 |
| JP | 10083435 | 3/1998 |
| JP | 2000260524 | 9/2000 |
| JP | 2001267013 | 9/2001 |
| JP | 2002367720 | 12/2002 |

* cited by examiner

*Primary Examiner*—Renee Luebke
(74) *Attorney, Agent, or Firm*—Collard & Roe, P.C.

(57) ABSTRACT

A card connector (100) receives and ejects a card therein and therefrom along receiving and ejecting directions ($Y_R$, $Y_E$). The card connector (100) comprises a housing (10). The housing (10) holds a slider (20) so that the slider (10) is slidable along the receiving and the ejecting directions ($Y_R$, $Y_E$), while carrying the card thereon. The slider (20) has an ejecting-directional end (20b) as an end thereof in the ejecting direction ($Y_E$). The card connector (100) is provided with a stopper (70), which is latchingly fitted with the ejecting-directional end (20b) of the slider (20). The stopper (20) serves to prevent the card from projecting out of the slider (20) in the ejecting direction ($Y_E$) even when the slider (20) partially projects from the housing (10) in the ejecting direction ($Y_E$), unless the latchingly-fit of the stopper (70) with the ejecting-directional end (20b) of the slider (20) is released. Thus, undesirable projection of the card upon ejection is prevented.

16 Claims, 15 Drawing Sheets

CARD CONNECTOR

This invention claims priority to prior Japanese application JP 2002-381428, the disclosure of which is incorporated herein by reference.

BACKGROUND OF THE INVENTION

This invention relates to a card connector for removably establishing an electrical connection of a card with an electric circuit device, and in particular, to such a card connector with a card ejection mechanism by using a slider or a slidable plate.

JP-A 2000-260524 or JP-A 2001-267013 discloses a card connector comprising an ejection mechanism. The ejection mechanism has a slider, a cam mechanism and a biasing member such as a spring. The slider is able to carry thereon a card such as an IC card, a memory card and a PC card. The cam mechanism controls the position of the slider between first and second positions. When the slider is positioned at the first position, the slider is received in the card connector as well as the card mounted on the slider. When the slider is positioned at the second position, the slider ejects the card from the card connector. The biasing member biases the slider towards the second position. When the card is completely pushed into the card connector, the cam mechanism keeps the slider at the first position. The state where the slider is kept at the first position is called as a locked state. Under the locked state, when the card is pressed again, the cam mechanism releases the slider from the first position, and the slider is then pressed towards the second position by the biasing member. This state where the locked state is released and the slider is able to move away from the first position is called as an unlocked state.

According to the conventional techniques, there arises a problem upon the ejection operation of the card. A projection speed of the card upon the ejection operation depends on a force of the biasing member and on the operator's finger. If the operator does not move away his/her finger from the card immediately after the locked state is released by using the finger, the ejection of the card is blocked by the finger. In order that the once blocked card continues to be ejected from the card connector after the operator's finger is moved away from the card, the biasing member has to have a relatively large force. However, if the biasing member has a relatively large force and if the operator moves away the finger from the card immediately after the locked state is released, the card is strongly pressed out of the card connector by the relatively large force of the biasing member. As a result, the card undesirably projects out of the card connector so that the card is damaged.

The conventional card connector disclosed in JP-A 2001-267013 takes up relatively large width in an instrument on which the card connector is installed. The conventional card connector disclosed in JP-A 2000-260524 takes up relatively large height (thickness). There is also a need to reduce of the size of the card connector.

SUMMARY OF THE INVENTION

It is an object of the present invention to provide a card connector which prevents a card from being damaged because of undesirable projection of the card form the card connector.

It is another object of the present invention to provide a card connector which is downsized.

According to this invention, there is provided with a card connector for receiving and ejecting a card therein and therefrom along receiving and ejecting directions which are opposite to each other, the card connector comprising: a housing; a slider slidably held by the housing, wherein the slider is slidable along the receiving and the ejecting directions, while carrying the card thereon, and the slider has an ejecting-directional end as an end thereof in the ejecting direction; and a stopper, which is latchingly fitted with the ejecting-directional end of the slider.

According to this invention, there is further provided with a card connector for receiving and ejecting a card therein and therefrom along receiving and ejecting directions which are opposite to each other. The card connector comprises: a housing; a slider slidably held by the housing, wherein the slider is slidable along the receiving and the ejecting directions, while carrying the card thereon; controlling means for controlling the slide of the slider between first and second positions, wherein the slider is received by the housing when being positioned at the first position, the slider partially projects from the housing when being positioned at the second position; and biasing means for biasing the slider towards the second position. The controlling means comprises: a cam member, which has a cam and is fixed to the slider, wherein the cam has a heart-like shape in a plane perpendicular to a lateral direction which is perpendicular to the receiving and the ejecting directions; a cam follower, which comprises a held portion, an arm portion and a follower portion, wherein the held portion is held by the housing and extends in the lateral direction, the arm portion extends from the held portion and forms a particular angle with the held portion, the particular angle is less than 90 degrees, the follower portion extends from the arm portion in the lateral direction and is arranged to be able to follow the heart-like shape of the cam; and a cam-follower presser, which presses the cam follower against the cam member in the lateral direction.

Preferred developments of the invention will be understood hereinafter as the explanation proceeds.

DESCRIPTION OF PREFERRED EMBODIMENTS

Figure 1:
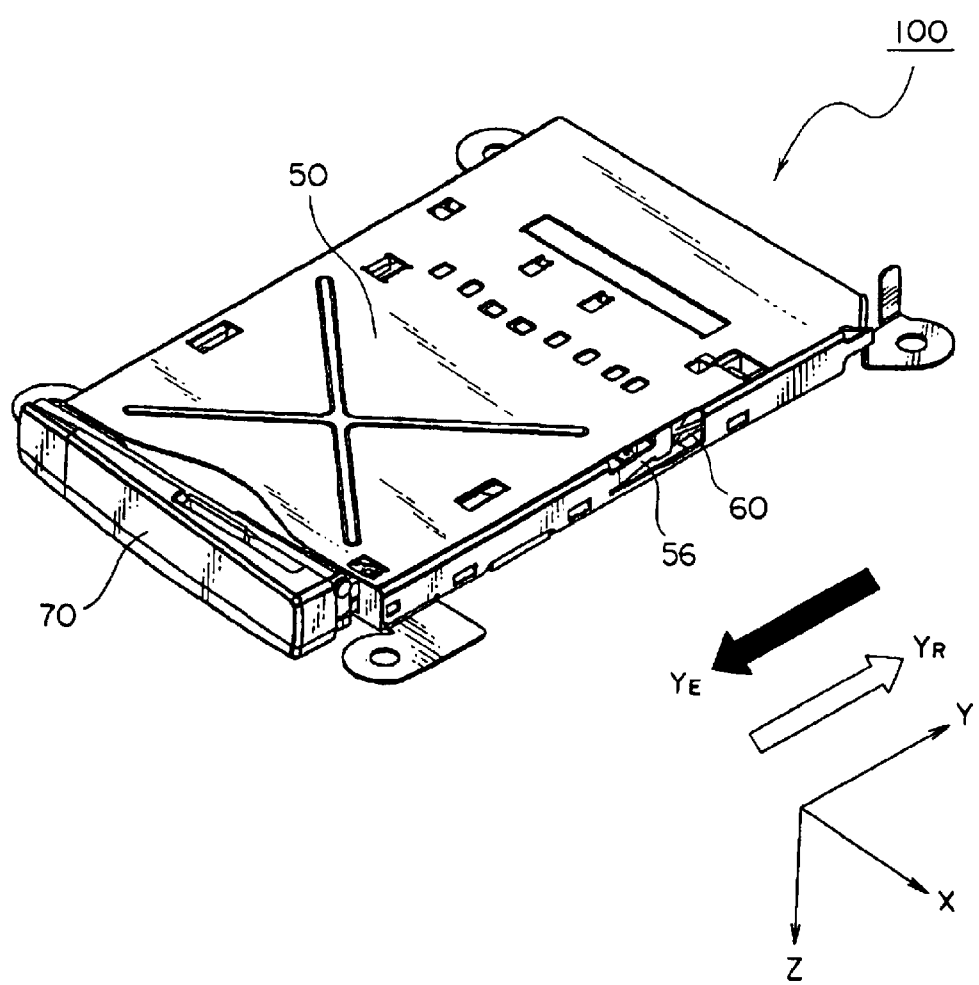
FIG. 1 is a bottom oblique view showing a card connector according to an embodiment of the present invention.

With reference to FIGS. 1 to 15, a card connector 100 according to an embodiment of the present invention comprises a housing 10, a slider 20, a cam member 30, a spring 40, a cover 50, a cam follower 60, a stopper 70 and a rotation axis 80. In this embodiment, the housing 10, the cam member 30 and the stopper 70 are made of resin. The slider 20, the spring 40, the cover 50, the cam follower 60 and the rotation axis 80 are made of metal. The card connector 100 is able to receive a card 200 therein along a receiving direction $Y_R$, which is shown by a white allow in FIG. 1. The card connector 100 is able to eject the card 200 therefrom along a ejecting direction $Y_E$, which is shown in black allow in FIG. 1. The receiving direction $Y_R$ is opposite to the ejecting direction $Y_E$.

Figure 2:
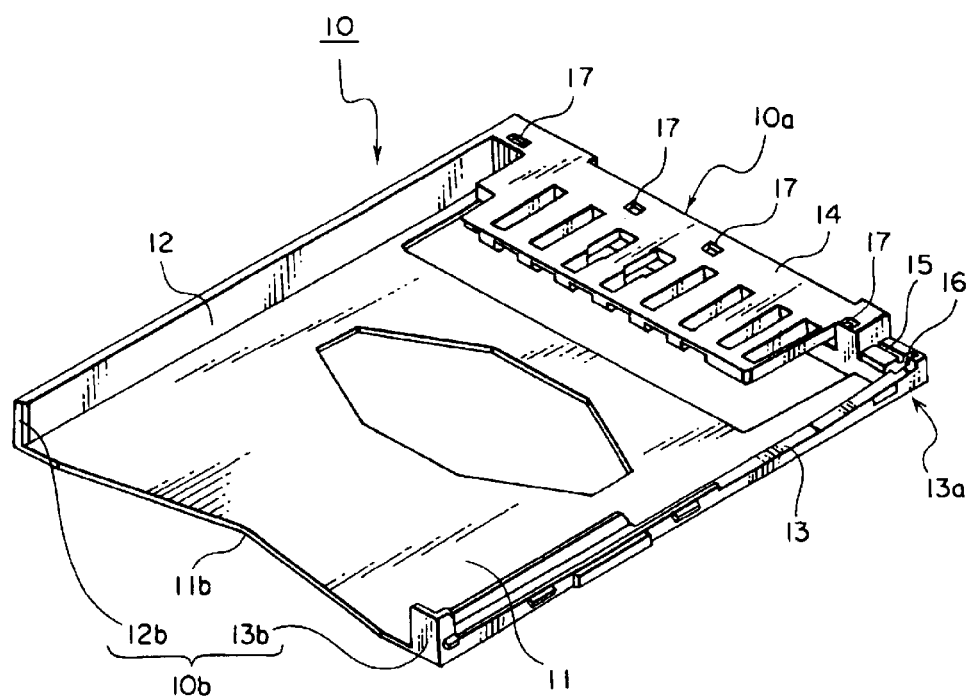
FIG. 2 is a bottom oblique view showing a housing included in the card connector of FIG. 1.
Figure 2:
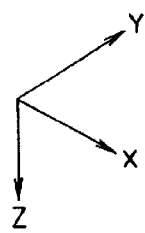
Figure 3:
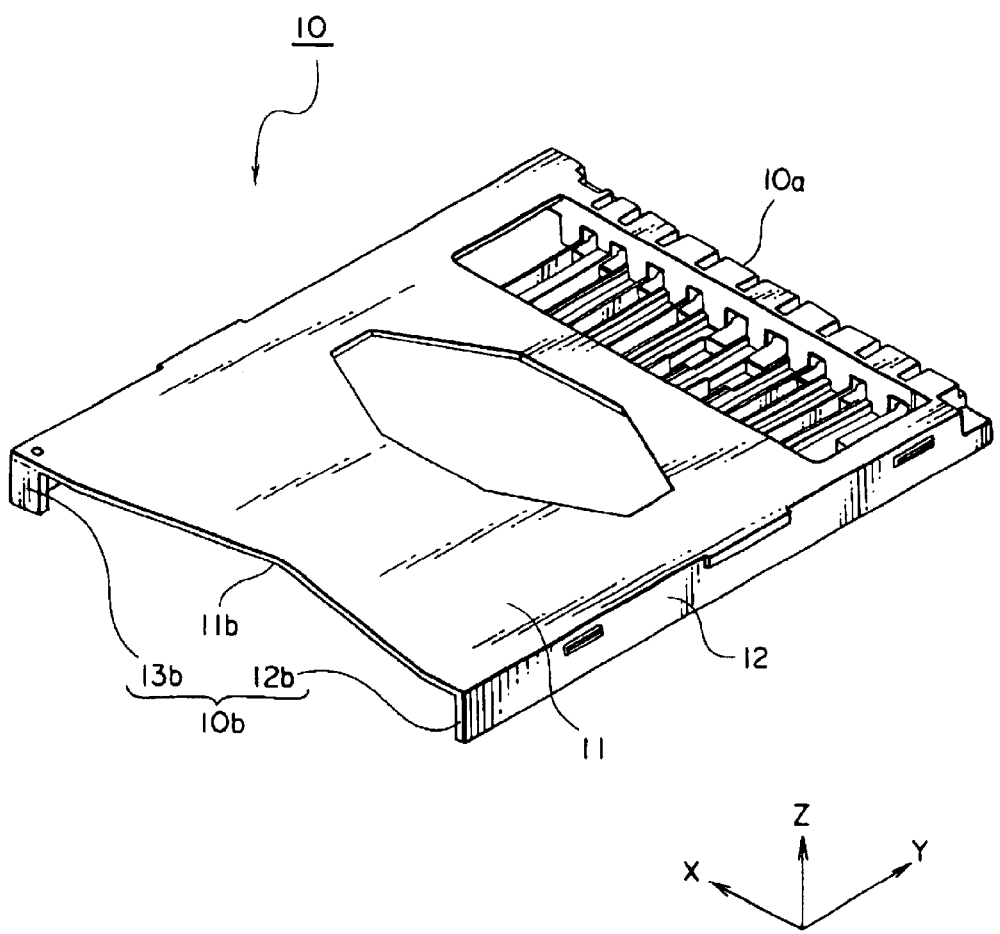
FIG. 3 is a top oblique view showing the housing of FIG. 2.

As shown in FIGS. 2 and 3, the housing 10 has front and rear ends 10a, 10b in a Y-direction, i.e. the receiving direction $Y_R$. The housing 10 is comprised of a top plate portion 11, opposite side portions 12, 13 and front block 14. Front ends 12a, 13a of the side portions 12, 13 and the front block 14 constitute the front end 10a of the housing 10. Rear end 11b of the top plate portion 11 and rear ends 12b, 13b of the side portions 12, 13 constitute the rear end 10b of the housing 10.

The top plate portion 11 connects between the side portions 12, 13 in an X-direction perpendicular to the Y-direction. The rear end 11b of the top plate portion 11 is gently depressed in the Y-direction.

The side portions 12, 13 are elongated in the Y-direction and also extend from the top plate portion 11 downwardly in a Z-direction perpendicular to the X- and the Y-directions. One side portion 13 is depressed upwards in the Z-direction. The front end 13a of the side portion 13 is formed with a holding portion 15 and a slit 16. The holding portion 15 is comprised of a groove and a hole continuing from the groove and extends in the X-direction. The front block 14 is formed with four engagement holes 17 extending in the Z-direction.

Figure 4:
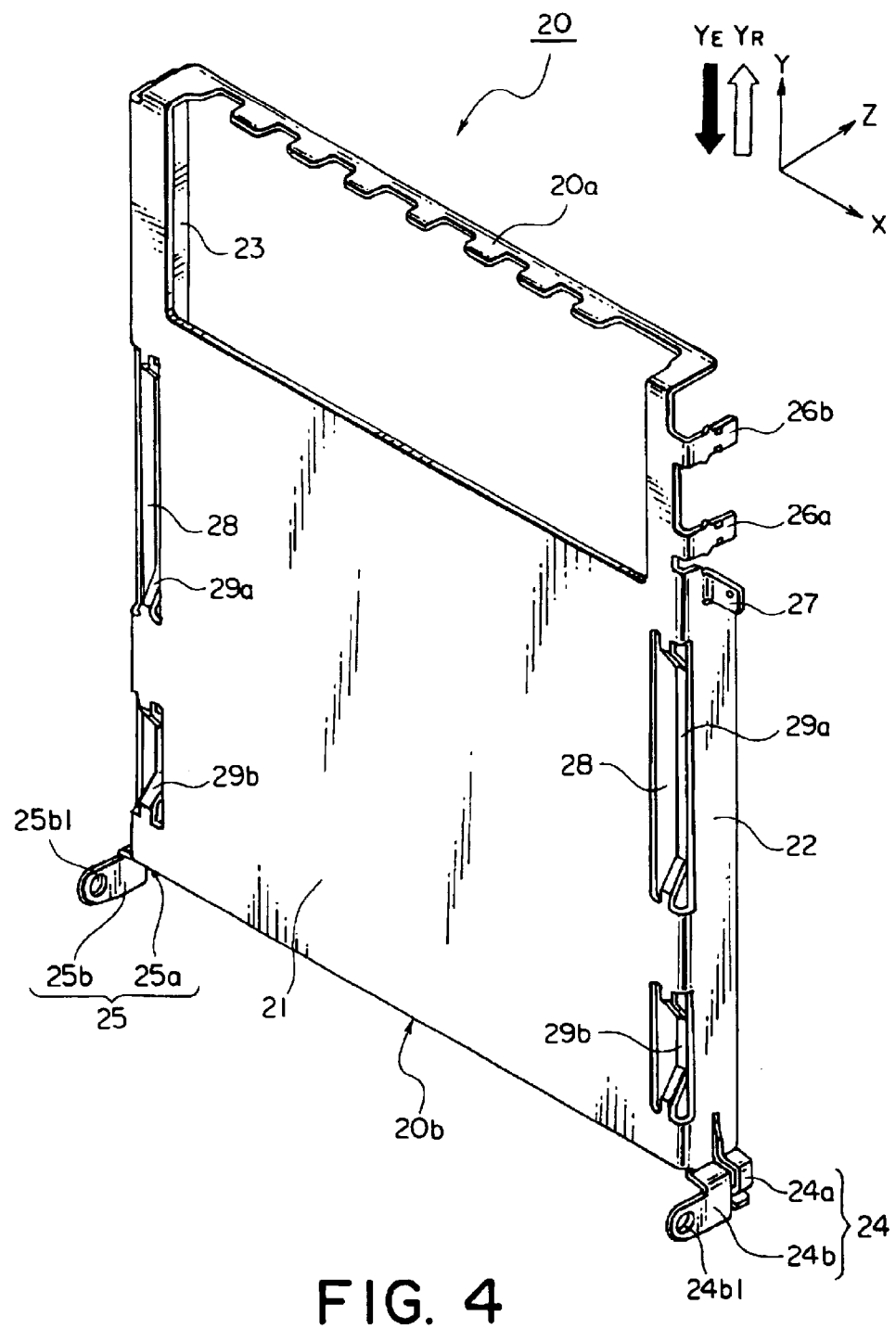
FIG. 4 is a bottom oblique view showing a slider included in the card connector of FIG. 1.
Figure 5:
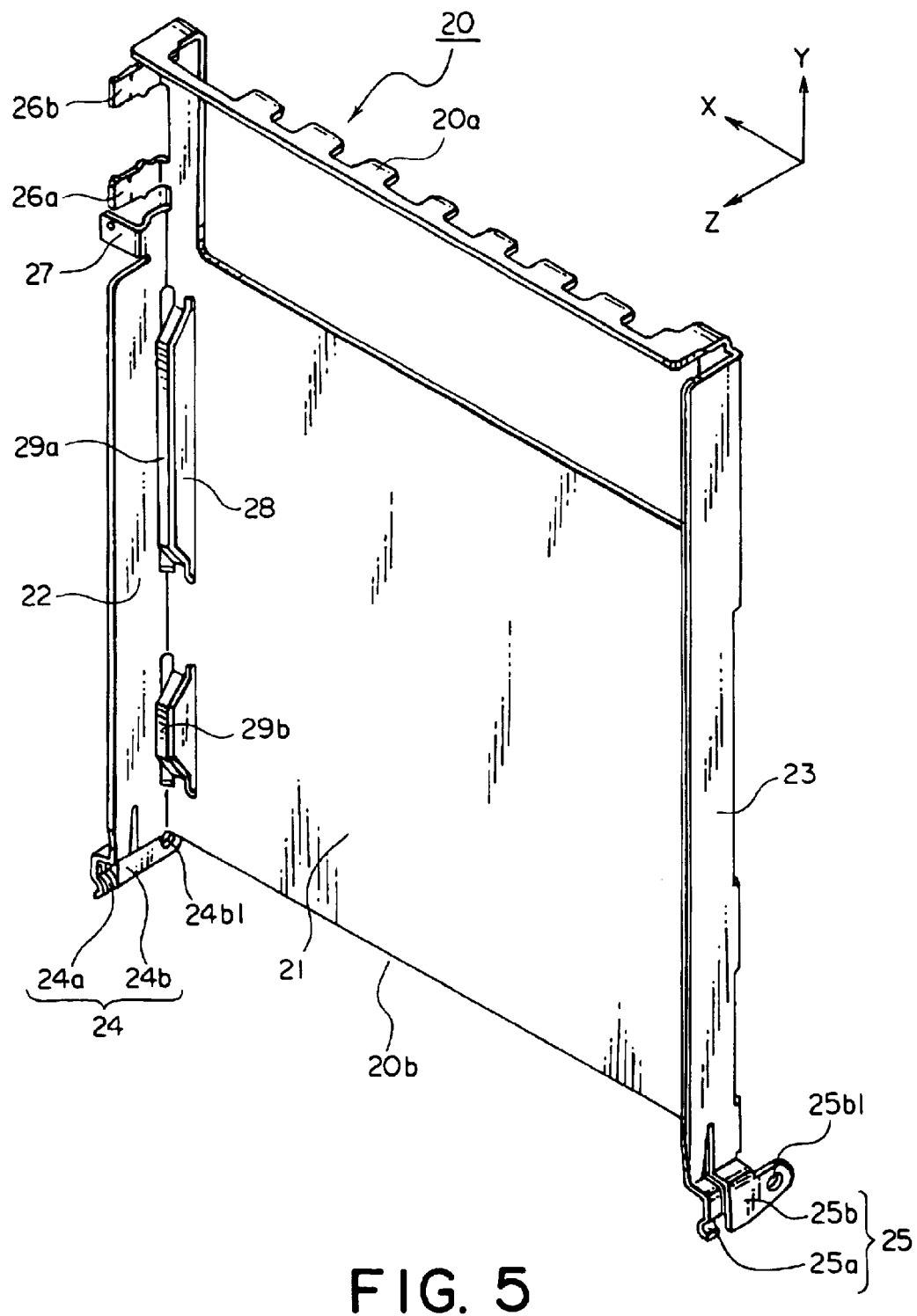
FIG. 5 is a top oblique view showing the slider of FIG. 4.

As shown in FIGS. 4 and 5, the slider 20 has front and rear ends 20a, 20b in the Y-direction. The front end 20a is an end in the receiving direction $Y_R$ and is also referred to as a receiving-directional end 20a. When the card 200 is inserted into the card connector 100 along the receiving direction $Y_R$, the receiving-directional end 20a of the slider 20 receives the card 200 and is pressed by the card 200 in the receiving direction $Y_R$ On the other hand, when the slider 20 is moved in the ejecting direction $Y_E$, the receiving-directional end 20a of the slider 20 presses the card 200 to move it in the ejecting direction $Y_E$. Thus, the slider 20 together with the card 200 is able to slide in the receiving/ejecting direction $Y_R$, $Y_E$. The rear end 20b is an end in the ejecting direction $Y_E$ and is also referred to as an ejecting-directional end.

The slider 20 is comprised of a bottom plate portion 21 and sidewall portions 22, 23. The bottom plate portion 21 connects between the sidewall portions 22, 23 in the X-direction. The sidewall portions 22, 23 are elongated in the Y-direction and also extend from the bottom plate portion 21 upwards in the Z-direction. The sidewall portions 22, 23 are provided with tab portions 24, 25, respectively. The tab portions 24, 25 constitute ejecting-directional end portions of the sidewall portions 22, 23, respectively. The tab portions 24 25 face each other in the X-direction. In this embodiment, the tab portions 24, 25 comprise first engagement portions 24a, 25a and downwardly-projecting portions 24b, 25b. The downwardly-projecting portions 24b, 25b projects downwardly in the Z-direction and beyond the bottom plate portion 21. The downwardly-projecting portions 24b, 25b are formed with receiving holes 24b1, 25b1, respectively. The positions of the receiving holes 24b, 25b are lower than the bottom plate portion 21 in the Z-direction.

Figure 9:
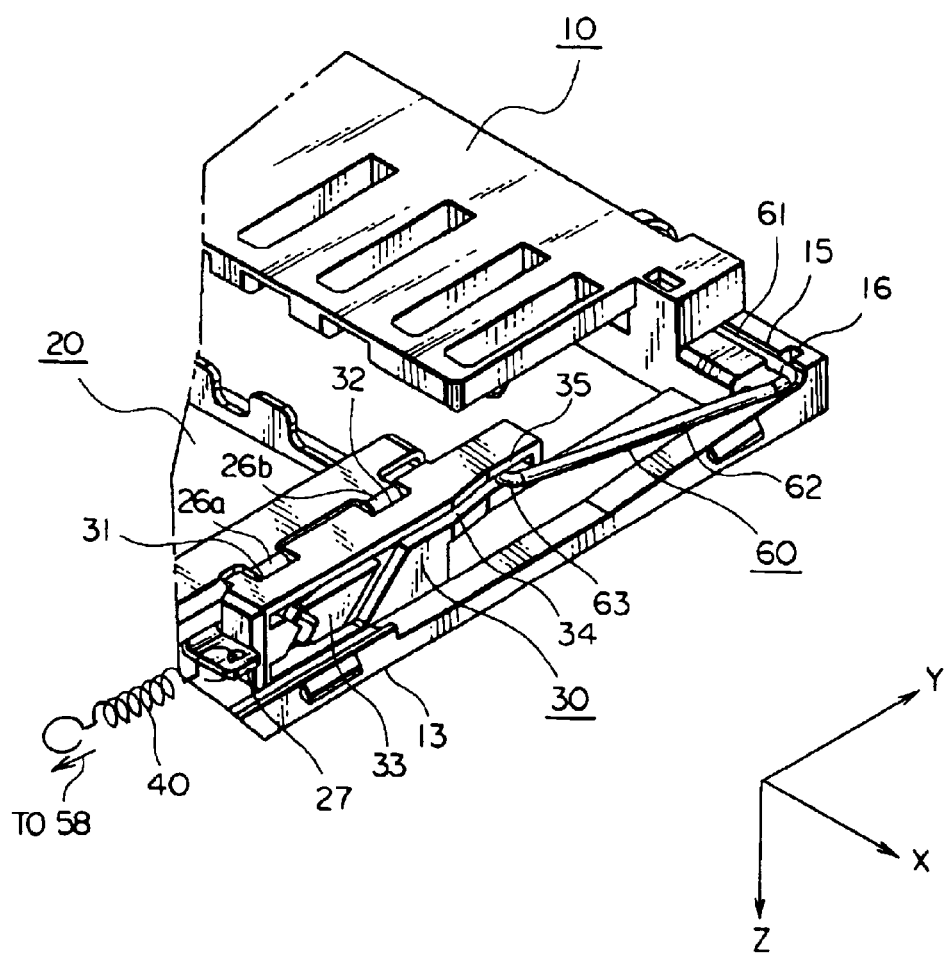
FIG. 9 is an enlarged view showing a part of the combination of FIG. 8, indicated by an enclosure IX.

The sidewall portion 22 is shorter than the other sidewall portion 23 to ensure space for fitting posts 26a, 26b. The fitting posts 26a, 26b are positioned nearer to the front end 20a of the slider 20 than the sidewall portion 22 in the Y-direction. The fitting posts 26a, 26b extends from the bottom plate portion 21 upwardly in the Z-direction. The sidewall portion 22 is provided with a hooked portion 27, which extends from a receiving-directional end of the sidewall portion 22 in the X-direction. On the hooked portion 27, one end of the spring 40 is hooked, as shown in FIG. 9.

As shown in FIGS. 4 and 5, the bottom plate portion 21 is provided with two slits 28 and four raised portions 29a, 29b. The slits 28 serve to guide the slide of the slider 20 in the Y-direction in cooperation with parts of the cover 50, which will be described in detail afterwards. The raised portions 29a, 29b serve as key portions, which prevent the card 200 from being inserted top side down by error. To this purpose, the card 200 also has key portions, which correspond to the raised portion 29a, 29b but are not shown in the drawings.

Figure 6:
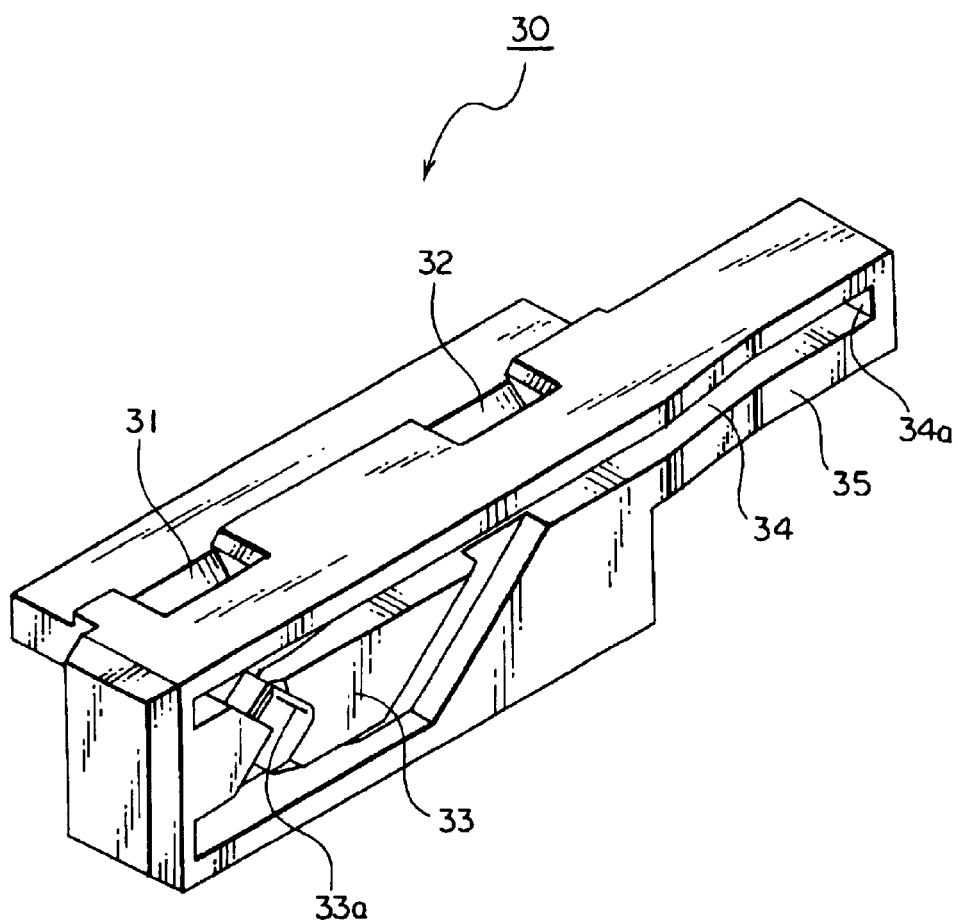
FIG. 6 is a perspective view showing a cam member included in the card connector of FIG. 1.
Figure 6:
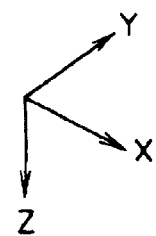
Figure 7:
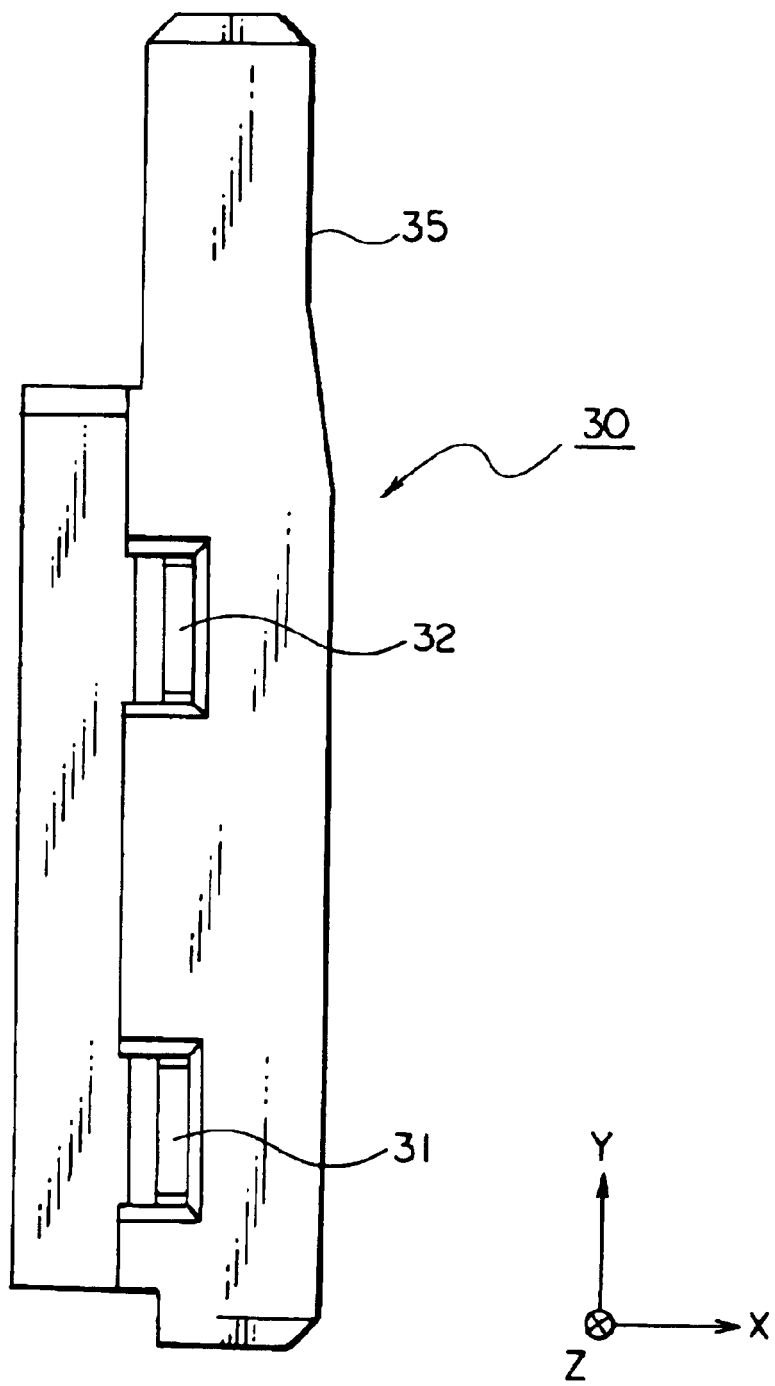
FIG. 7 is a bottom view showing the cam member of FIG. 6.
Figure 8:
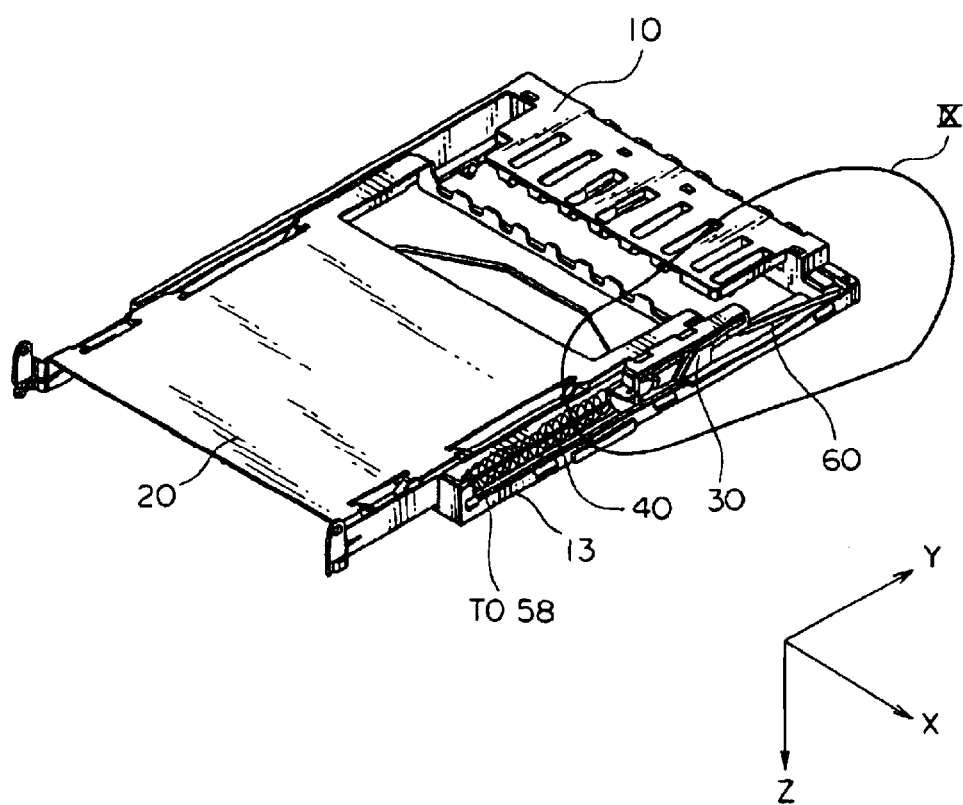
FIG. 8 is a bottom oblique view showing a combination of the housing, the slider, the cam member shown in FIGS. 2, 4, 6, respectively, and a cam follower and a spring, which are also included in the card connector of FIG. 1.

As shown in FIGS. 6 and 7, the cam member 30 is an insulator piece elongated in the Y-direction. The cam member 30 is formed with two engagement holes 31, 32, which extend from a bottom surface of the cam member 30 upwardly in the Z-direction. Into the engagement holes 31, 32, the engagement posts 26a, 26b of the slider 20 are press-fitted so that the cam member 30 is attached to the slider 20, as shown in FIGS. 8 and 9.

With reference to FIGS. 6 and 7, the cam member 30 is provided with a cam 33, which has a heart-like shape in the YZ plane. The cam member 30 is further provided with a groove 34, which guides the movement of the cam follower 60 to the cam 33. One end of the cam member 30 is depressed in a direction opposite to the X-direction. That depressed portion is called a laterally-depressed portion 35.

With reference to FIG. 9, the cam follower 60 is comprised of a held portion 61, an arm portion 62 and a follower portion 63. The held portion 61 is held by the holding portion 15 of the housing 10 so that the held portion 61 extends towards the middle of the housing 10 in the X-direction. Under the held state, the held portion 61 also traverses the slit 16 of the housing 10 in the X-direction. The arm portion 62 extends from the held portion 61. The arm portion 62 forms a particular angle with the held portion 61, wherein the particular angle is less than 90 degrees so that the follower portion 63 is positioned nearer to the middle of the housing 10 in the X-direction than the connection portion of the held portion 61 and the arm portion 62. The follower portion 63 extends from the arm portion 62 towards the middle of the housing 10 in the X-direction. The follower portion 63 is received within the groove 34 of the cam member 30 and follows the heart-like shaped cam 33 when the cam member 30 as well as the slider 20 is moved along the Y-direction. The particular angle of the cam follower 60 is sized to be suitably received in the groove 34 formed in the laterally-depressed portion 35 so that the lateral size of the card connector 100 is reduced. In addition, the laterally-depressed portion 35 is positioned nearer to the held portion 61 of the cam follower 60 than the cam 33, as shown in FIG. 9.

Figure 10:
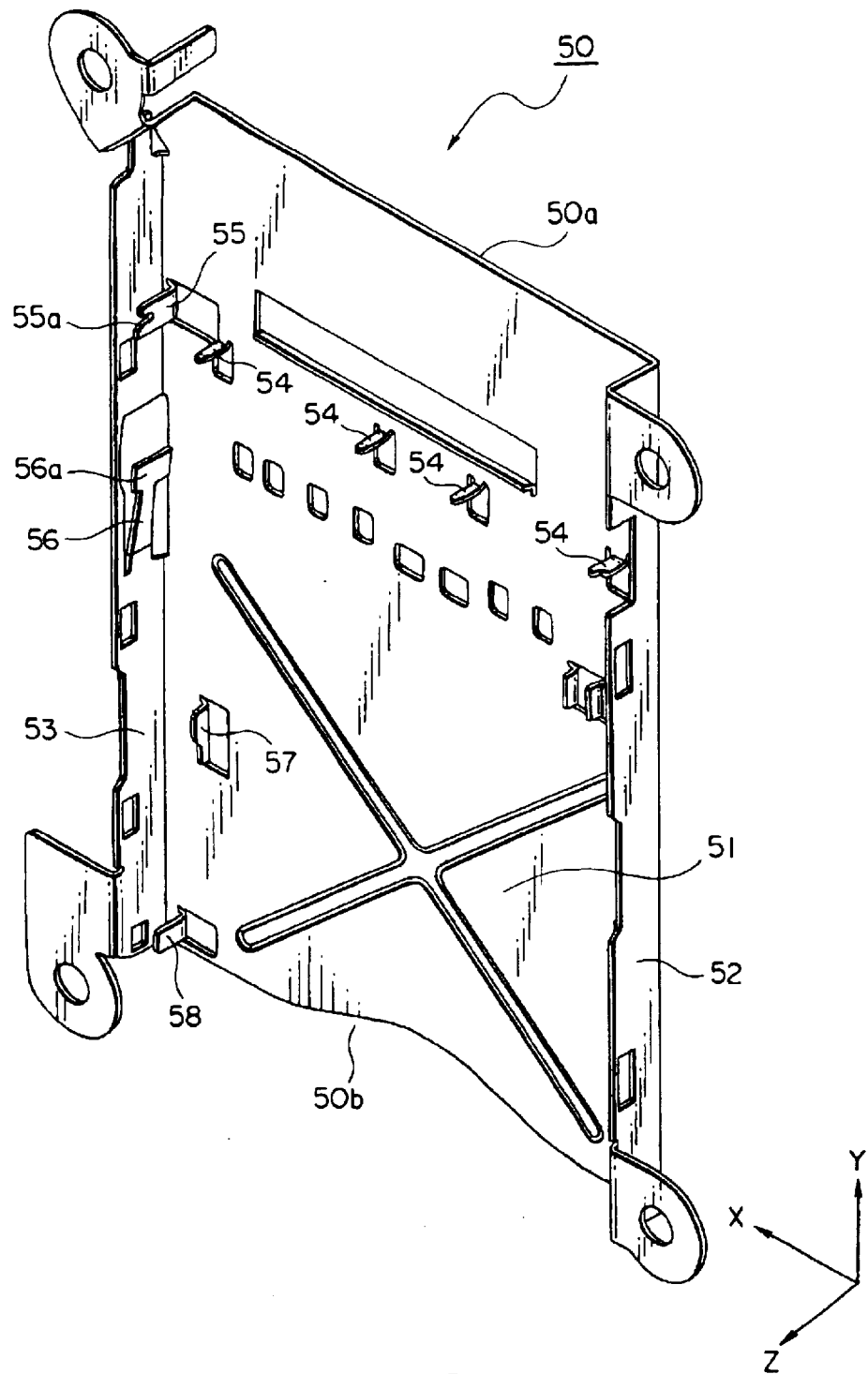
FIG. 10 is a top oblique view showing a cover included in the card connector of FIG. 1.
Figure 11:
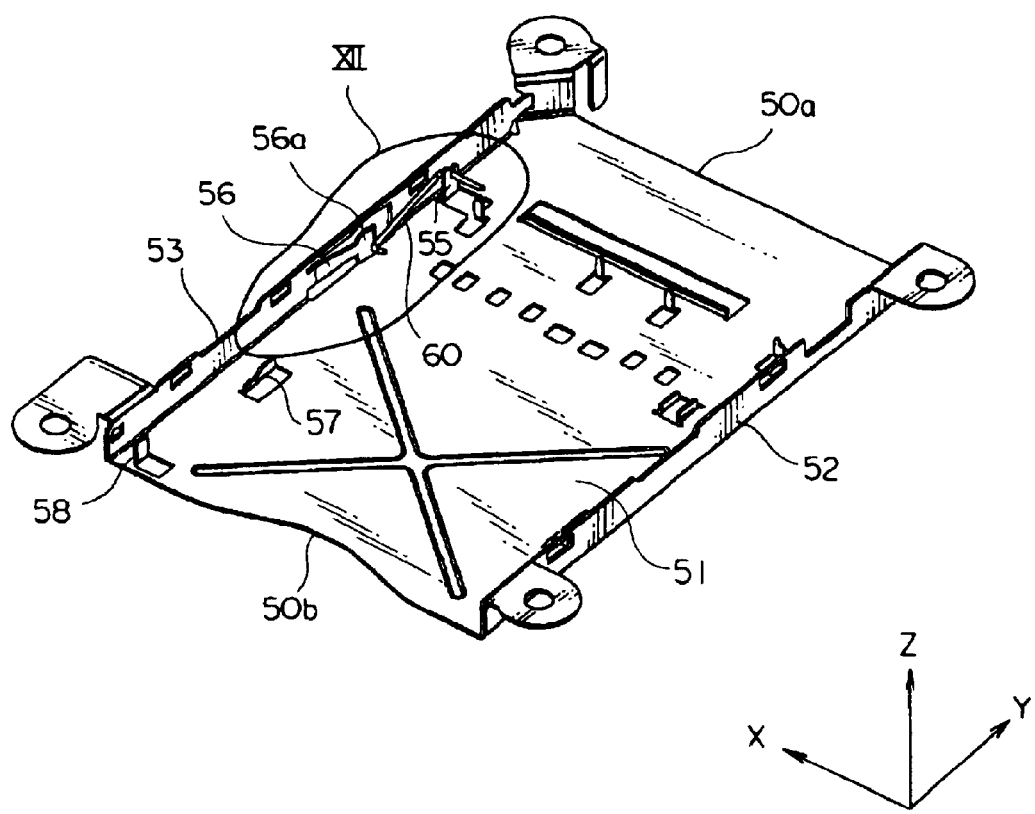
FIG. 11 is a top oblique view showing a combination of the cover of FIG. 10 and the cam follower.
Figure 12:
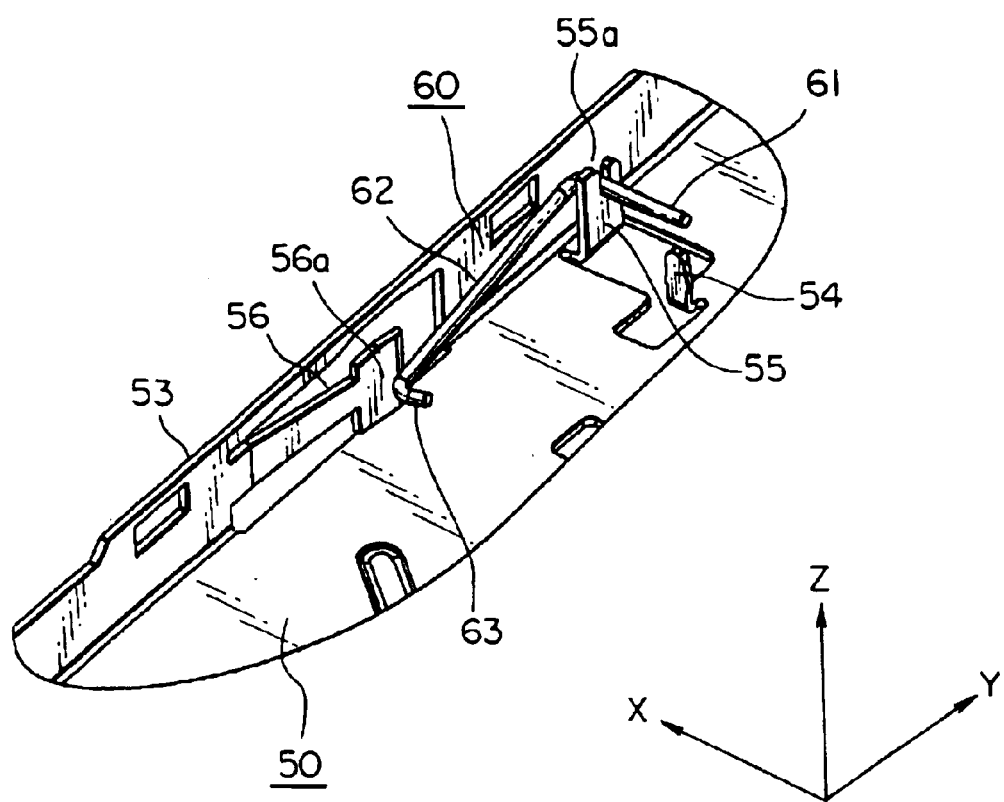
FIG. 12 is an enlarged view showing a part of the combination of FIG. 11, indicated by an enclosure XII.

As shown in FIG. 10, the cover 50 has front and rear ends 50a, 50b. In this embodiment, the cover 50 has the Y-directional size greater than that of the housing 10 or the slider 20. The front end 50a of the cover 50 projects from the front end 10a of the housing 10 in the Y-direction under the assembled state thereof, as will be described later. The rear end 50b of the cover 50 together with the rear end 10b of the housing 10 constitutes an opening. The cover 50 and the housing 10 also define a cavity which communicates with the opening. The slide 20 can be received in the cavity through the opening and can partially projects through the opening from the combination of the housing 10 and the cover 50.

The cover 50 is comprised of a bottom plate portion 51 and side portions 52, 53. On the bottom plate portion 51, four engagement posts 54 are formed. The engagement posts 54 stand up from the bottom plate portion 51 in the Z-direction. The engagement posts 54 are engagingly inserted into the engagement holes 17 of the housing 10 so that the cover 50 is fixed and secured to the housing 10 and surrounds the housing 10, especially bottom and side portions of the housing 10. The bottom plate portion 51 is provided with a fixing portion 55, which has a forked portion 55a. The fixing portion 55 is fittingly inserted into the slit 16 of the housing 10 so that the forked portion 55a catches the held portion 61 of the cam follower 60. The caught position of the held portion 61 is nearer to the arm portion 62 than a part of the held portion 61 which is supported by the holding portion 15, as seen from FIGS. 9, 11 and 12.

With reference to FIG. 10, the side portion 53 nearer to the fixing portion 55 than the other side portion 52 is provided with a cam-follower presser 56. The cam-follower presser 56 is obtained by making cuts into the side portion 53 to form a plate-spring like portion, followed by slightly bending the plate-spring like portion towards an inside of the cover 50 in the X-direction. The cam-follower presser 56 has a free end 56a as a receiving-directional end, i.e. an end of the cam-follower presser 56 nearer to the front end 50a of the cover 50 than to the rear end 50b of the cover 50. The free end 56a is wider than the remaining part of the cam-follower presser 56 in the Z-direction such that, when facing the cam 33 in the X-direction, the free end 56a extends over the heart-like shape of the cam 33. Thus, the free end 56a always presses the arm portion 62 against the cam member 60 in the X-direction.

The bottom plate portion 51 is formed with guided portions 57, each of which stands up from the bottom plate portion 51 in the Z-direction and extends in the Y-direction. The guided portions 57 are received in the slits 28 of the slider 20 so that the slide of the slider 20 in the Y-direction is guided suitably under the assembled state of the card connector 10.

The bottom plate portion 51 is further formed with a hooked portion 58. On the hooked portion 58, one end of the spring 40 is hooked under the assembled state of the card connector 10. Thus, the front end (a receiving-directional end) of the spring 40 is coupled to the hooked portion 27 of the slider 20, while the rear end (an ejecting-directional end) of the spring 40 is coupled to the hooked portion 58 of the cover 50, so that the spring 40 urges the slider 20 to project from the housing 10 and the cover 50 in the ejecting direction $Y_E$.

As shown in FIGS. 8 and 9, the slider 20 together with the cam member 30 is slidably held by the housing 10. The slidable range of the slider 20 is controlled between first and second positions by the cam member 30 and the cam follower 60. Thus, the cam member 30 and the cam follower 60 constitute controlling means for controlling the position of the slider 20. The controlling means may include the cam-follower presser 56.

When the follower portion 63 of the cam follower 60 is brought into contact with a depression 33a of the heart-like shaped cam 33, while the cam member 30 opposes the ejection force of the spring 40, the slider 20 is locked at the first position. When being positioned at the first position, the slider 20 is received by the housing 10. When the follower portion 63 of the cam follower 60 goes out of the depression 33a of the cam 33, the locked state of the slider 20 is released so that the spring 40 forces the slider 20 to project from the housing 10 in the ejecting direction $Y_E$. As the slider 20 continues to project in the ejecting direction $Y_E$, the follower portion 63 is brought into contact with a receiving-directional wall 34a of the groove 34 of the cam member 30. Under this state, the slider is positioned at the second position. In other words, the slider 20 partially projects from the housing 10 when being positioned at the second position. For example, the second position is shown in FIG. 8. As seen from the above-mentioned operations, the spring 40 can be referred to as biasing means for biasing the slider 20 towards the second position. The spring 40 can be replaced with another member that serves as the biasing means.

Figure 13:
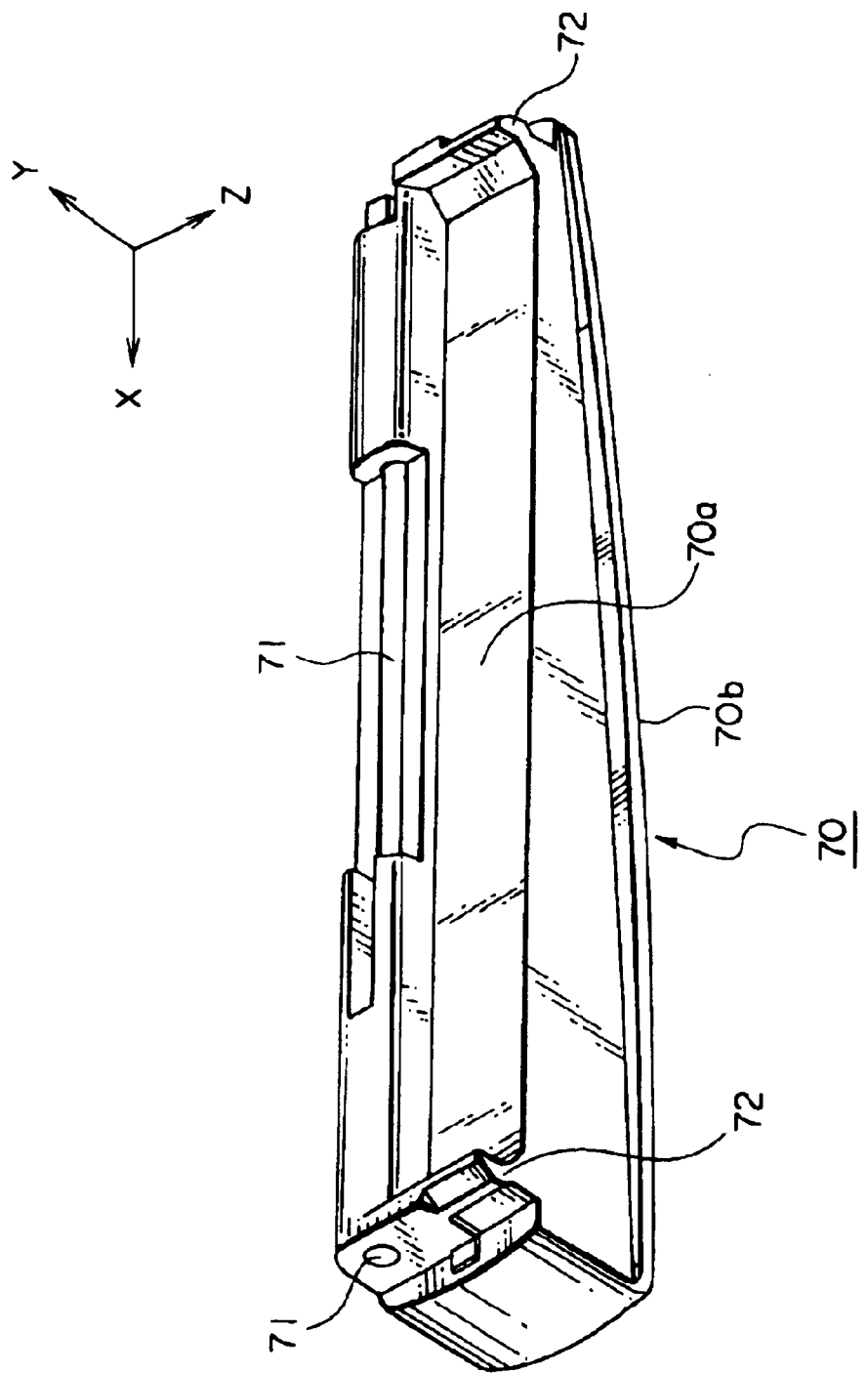
FIG. 13 is a top oblique view showing a stopper included in the card connector of FIG. 1.
Figure 14:
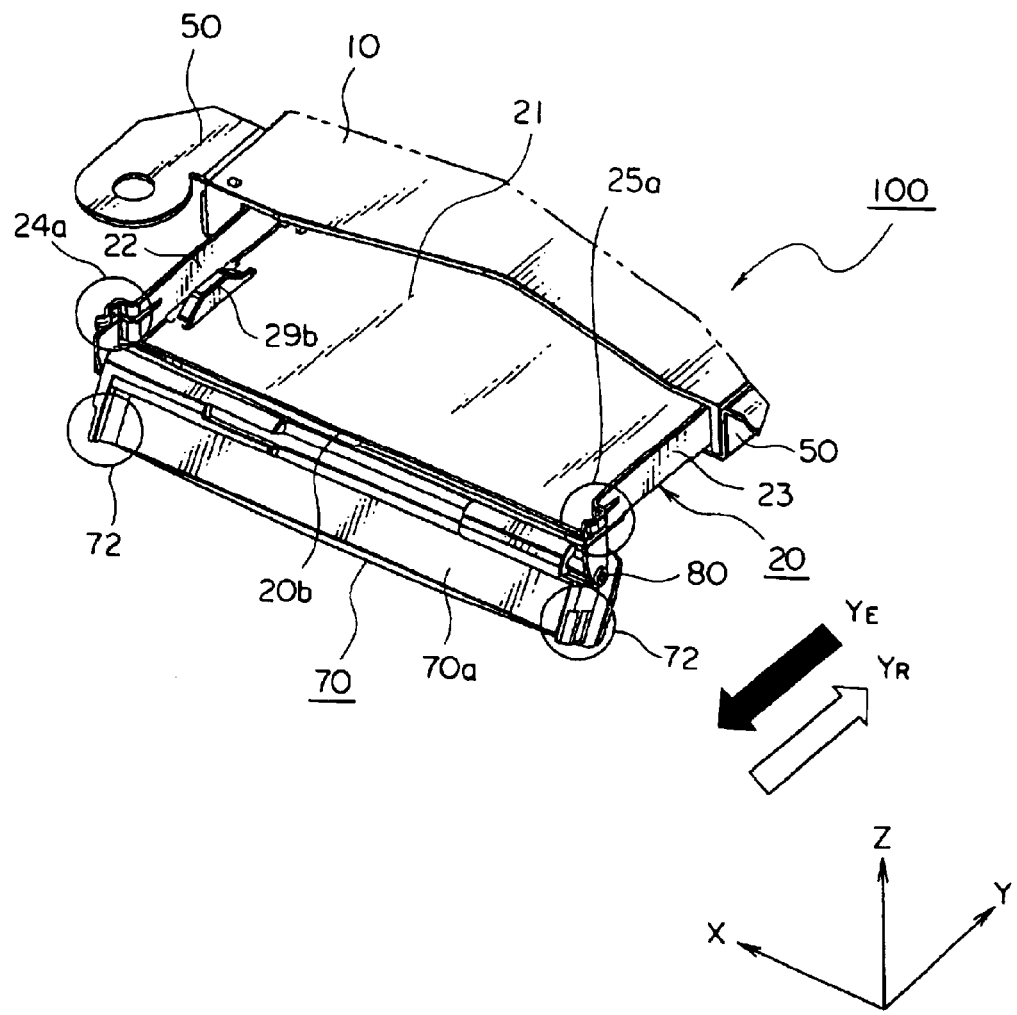
FIG. 14 is a top oblique view showing a part of the card connector of FIG. 1.

With reference to FIG. 13, the stopper 70 is provided with a stopper surface 70a and an operation surface 70b. In this embodiment, the operation surface 70b is slanted. The stopper 70 is formed with receiving portion 71, which extends in the X-direction. The receiving portion 71 of the stopper 70 as well as the receiving holes 24b1, 25b1 of the slider 20 receives the rotation axis 80, as shown in FIG. 14, so that the stopper 70 is rotatably provided for the ejecting-directional end 20b of the slider 20. The stopper 70 is further provided with second engagement portions 72, which are positioned at opposite sides of the stopper 70 in the X-direction. The second engagement portions 72 are to be engaged with the first engagement portions 24a, 25a of the slider 20. As far as the second engagement portions 72 are able to be engaged with the first engagement portions 24a, 25a of the slider 20, the second engagement portions 72 are not positioned at the opposite sides of the stopper 70. For example, the second engagement portions 72 may be positioned adjacent to the opposite sides of the stopper 70.

The stopper 70 is rotatable around the rotation axis 80 between first and second rotation positions. When being positioned at the first rotation position, the first engagement portions 24a, 25a of the slider 20 are engaged with the second engagement portions 72 so that the stopper 70 is latchingly fitted with the ejecting-directional end 20b of the slider 20. When the latchingly fit of the stopper 70 with the ejecting-directional end 20b of the slider 20 is released, the stopper 70 can rotate around the rotation axis 80 so that the stopper 70 is positioned at the second rotation position. When the stopper 70 is positioned at the second rotation position, the stopper 70 does not obstruct the ejection of the card 200 any longer.

Figure 15:
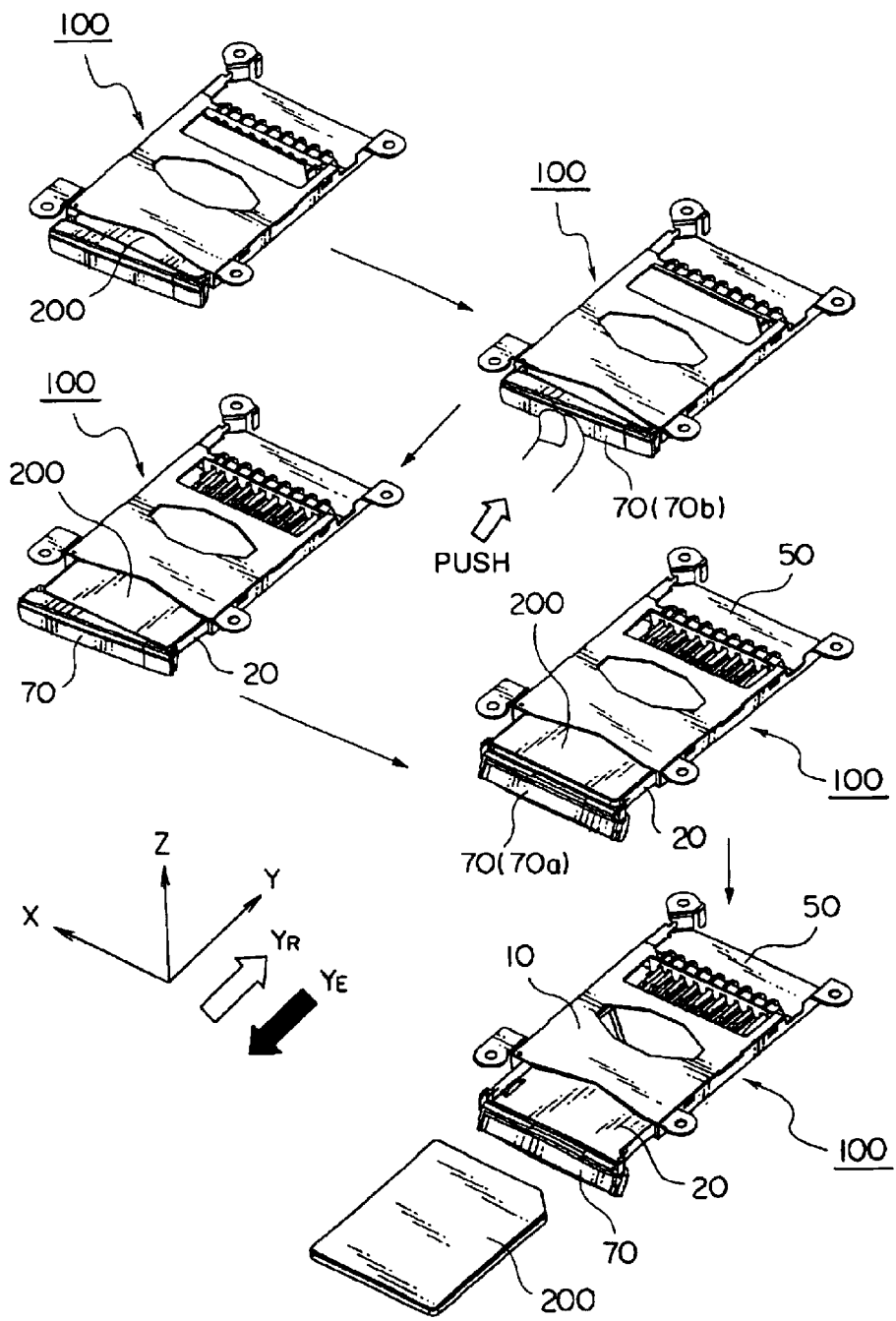
FIG. 15 is a set of perspective views showing ejection operations of a card from the card connector of FIG. 1.

With reference to FIG. 15, explanation will be made about an operation of the card connector 100.

Under the state where the card connector 100 receives the card 200, when the operation surface 70b of the stopper 70 is pushed by an operator's finger, the locked state of the slider 20 is released so that the slider 20 together with the card 200 projects from the card connector 100 in the ejecting direction $Y_E$.

Note here that, under the latchingly fit of the stopper 70 with the ejecting-directional end 20b of the slider 20, the card 200 is received by the stopper surface 70a of the stopper 70 and is prevented from coming out of the card connector 100 by the stopper 70. Therefore, the force of the spring 40 can be made relatively large.

To take the card 200 out of the slider 20, the latchingly fit of the stopper 70 with the ejecting-directional end 20b of the slider 20 is released. Under the released state, the card 200 can be slid out of the slider 20 in the ejecting direction $Y_E$.

What is claimed is:

1. A card connector for receiving and ejecting a card therein and therefrom along receiving and ejecting directions which are opposite to each other, the card connector comprising:
   a housing;
   a slider slidably held by the housing, wherein the slider is slidable along the receiving and the ejecting directions, while carrying the card thereon, and the slider has an ejecting-directional end as an end thereof in the ejecting direction;
   a stopper, which is fitted with the ejecting-directional end of the slider with latching by the slider; and
   controlling means for controlling the slide of the slider between first and second positions, wherein the slider is received by the housing when being positioned at the first position, the slider partially projects from the housing when being positioned at the second position; and
   biasing means for biasing the slider towards the second position,
   the controlling means comprising:
   a cam member, which has a cam and is fixed to the slider, wherein the cam has a heart-like share in a plane perpendicular to a lateral direction which is perpendicular to the receiving and the ejecting directions; and
   a cam follower, which comprises a held portion, an arm portion and a follower portion, wherein the held portion is held by the housing and extends in the lateral direction, the arm portion extends from the held portion and forms a particular angle with the held portion, the particular angle is less than 90 degrees, the follower portion extends from the arm portion in the lateral direction and is arranged to be able to follow the heart-like shape of the cam.

2. The card connector according to claim 1, wherein the stopper serves to prevent the card from projecting out of the slider in the ejecting direction even when the slider partially projects from the housing in the ejecting direction, unless the latching is released.

3. The card connector according to claim 1, wherein the controlling means is independent of and is separated from the stopper.

4. The card connector according to claim 1, wherein the stopper is rotatable between first and second rotation positions; the stopper is fitted with the ejecting-directional end with latching by the slider when being positioned at the first rotation position; and, when the latching is released, the stopper is positioned at the second rotation position.

5. The card connector according to claim 4, wherein the stopper is rotatable around a rotation axis, which extends in a lateral direction perpendicular to the receiving and the ejecting directions.

6. The card connector according to claim 1, wherein the controlling means further comprises a cam-follower presser, which presses the cam follower against the cam member in the lateral direction.

7. The card connector according to claim 6, further comprising a cover, which surrounds the housing and is provided with the cam-follower presser.

8. The card connector according to claim 7, wherein the slider has sidewall portions which are opposite to each other in the lateral direction and each of which has an ejecting-directional end portion as an end portion thereof in the ejecting direction; and the rotation axis of the stopper extends between the ejecting-directional end portions of the opposite sidewall portions.

9. The card connector according to claim 8, wherein the slider has a bottom portion which is adapted to be received with the card and connects between the sidewall portions in the lateral direction; the ejecting-directional end portions of the sidewall portions are tab portions, respectively, which face each other and partially project downwards beyond the bottom portion of the slider; projecting portions of the tab portions are formed with axis receiving holes, respectively, which receive the rotation axis of the stopper.

10. The card connector according to claim 9, wherein: the tab portions are provided with first engagement portions, respectively; the stopper is provided with second engagement portions, which are positioned at or adjacent to opposite sides of the stopper in the lateral direction and are to be engaged with the respective first engagement portions with latching therebetween.

11. A card connector for receiving and ejecting a card therein and therefrom along receiving and ejecting directions which are opposite to each other, the card connector comprising:
   a housing;
   a slider slidably held by the housing, wherein the slider is slidable along the receiving and the ejecting directions, while carrying the card thereon;
   controlling means for controlling the slide of the slider between first and second positions, wherein the slider is received by the housing when being positioned at the first position, the slider partially projects from the housing when being positioned at the second position; and
   biasing means for biasing the slider towards the second position,
   wherein the controlling means comprises:
   a cam member, which has a cam and is fixed to the slider, wherein the cam has a heart-like shape in a plane perpendicular to a lateral direction which is perpendicular to the receiving and the ejecting directions;
   a cam follower, which comprises a held portion, an arm portion and a follower portion, wherein the held portion is held by the housing and extends in the lateral direction, the arm portion extends from the held portion and forms a particular angle with the held portion, the particular angle is less than 90 degrees, the follower portion extends from the arm portion in the lateral direction and is arranged to be able to follow the heart-like shape of the cam; and
   a cam-follower presser, which presses the cam follower against the cam member in the lateral direction.

12. The card connector according to claim 11, wherein the cam member and the cam follower are arranged on one line substantially extending in the receiving and the ejecting directions.

13. The card connector according to claim 11, wherein the cam member has a laterally-depressed portion which is depressed in the lateral direction in comparison with the cam; and the laterally-depressed portion constitutes one end of the cam member and is positioned nearer to the held portion of the cam follower than the cam.

14. The card connector according to claim 11, wherein the free end of the cam-follower presser which is wider than the remaining part of the cam-follower presser such that, when the free end faces the cam in the lateral direction, the free end extends over the cam in a vertical direction perpendicular to the lateral direction and the receiving and the ejecting directions.

15. The card connector according to claim 11, further comprising a cover, which surrounds the housing and is provided with the cam-follower presser.

16. The card connector according to claim 15, wherein the cover is made of metal and has a side portion, which faces a side of the housing; the cam-follower presser is obtainable by making cuts into the side portion of the cover and has a free end slightly bent towards an inside of the cover in the lateral direction; the free end of the cam-follower presser presses a part of the arm portion of the cam follower; and the part of the arm portion is positioned nearer to the follower portion than to the held portion.

* * * * *